(12) United States Patent
Grant et al.

(10) Patent No.: US 8,982,068 B2
(45) Date of Patent: Mar. 17, 2015

(54) MULTIPLE ACTUATION HANDHELD DEVICE WITH FIRST AND SECOND HAPTIC ACTUATOR

(75) Inventors: Danny A. Grant, Montreal (CA); Robert W. Heubel, San Leandro, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 13/475,334

(22) Filed: May 18, 2012

(65) Prior Publication Data

US 2012/0229402 A1     Sep. 13, 2012

Related U.S. Application Data

(63) Continuation of application No. 12/237,334, filed on Sep. 24, 2008, now Pat. No. 8,749,495.

(51) Int. Cl.
*G06F 3/041* (2006.01)
*G06F 3/01* (2006.01)

(52) U.S. Cl.
CPC .............. *G06F 3/016* (2013.01); *G06F 3/041* (2013.01)
USPC ........................ 345/173; 715/701; 715/702

(58) Field of Classification Search
CPC ........... G06F 3/01; G06F 3/011; G06F 3/016; G06F 3/0416; G06F 3/048; G06F 3/0481; G06F 2203/013; G06F 2203/014; G06F 2203/015
USPC .......... 345/156–157, 173–179; 715/700–702, 715/766–767, 773, 803, 856, 859–860; 178/18.03–18.11; 341/20, 33; 310/311, 310/320

See application file for complete search history.

(56) References Cited

U.S. PATENT DOCUMENTS 4,127,752 A   11/1978   Lowthorp
4,692,756 A    9/1987   Clark
(Continued)

FOREIGN PATENT DOCUMENTS

CN         1668991 A    9/2005
CN         2857154 Y    1/2007
WO   WO 2006/042309 A1    4/2006

OTHER PUBLICATIONS

Chinese Office Action dated Jan. 24, 2013 for corresponding Chinese Patent Application No. 200980137633.4.
(Continued)

*Primary Examiner* — Temesgh Ghebretinsae
*Assistant Examiner* — Keith Crawley
(74) *Attorney, Agent, or Firm* — Kilpatrick Townsend & Stockton LLP

(57) ABSTRACT

A device includes a housing, a processor that is coupled to the housing, the processor is configured to process a software program stored in a memory. A touch screen is coupled to the housing and configured to display graphical objects, wherein a sensor signal associated with a user's interaction with the touch screen is provided to the processor. A first actuator is coupled to the touch screen and positioned within the housing. The first actuator is configured to output a first haptic effect to the touch screen upon receiving a first activating signal from the processor. A second actuator is coupled to the housing and configured to output a second haptic effect to the housing upon receiving a second activating signal from the processor. The first activating signal is associated with a foreground event and the second activating signal is associated with a background event occurring in the software program.

15 Claims, 3 Drawing Sheets

FIG. 4

(56) References Cited

U.S. PATENT DOCUMENTS

| | | | |
|---|---|---|---|
| 4,782,327 A | 11/1988 | Kley et al. | |
| 4,791,416 A | 12/1988 | Adler | |
| 4,798,919 A | 1/1989 | Miessler et al. | |
| 4,821,030 A | 4/1989 | Batson et al. | |
| 4,983,786 A | 1/1991 | Stevens et al. | |
| 5,053,585 A | 10/1991 | Yaniger | |
| 5,086,296 A | 2/1992 | Clark | |
| 5,237,327 A | 8/1993 | Saitoh et al. | |
| 5,241,308 A | 8/1993 | Young | |
| 5,293,158 A | 3/1994 | Soma | |
| 5,355,148 A | 10/1994 | Anderson | |
| 5,496,174 A | 3/1996 | Garner | |
| 5,521,336 A | 5/1996 | Buchanan et al. | |
| 5,729,249 A | 3/1998 | Yasutake | |
| 5,767,457 A | 6/1998 | Gerpheide et al. | |
| 5,887,995 A | 3/1999 | Holehan | |
| 5,917,906 A | 6/1999 | Thornton | |
| 5,943,044 A | 8/1999 | Martinelli et al. | |
| 5,959,613 A * | 9/1999 | Rosenberg et al. | 345/161 |
| 5,988,902 A | 11/1999 | Holehan | |
| 6,225,976 B1 | 5/2001 | Yates et al. | |
| 6,647,359 B1 | 11/2003 | Verplank et al. | |
| 6,819,312 B2 | 11/2004 | Fish | |
| 7,168,042 B2 * | 1/2007 | Braun et al. | 715/701 |
| 7,425,675 B2 | 9/2008 | Chu | |
| 7,906,720 B2 | 3/2011 | Delorme | |
| 2001/0002126 A1 * | 5/2001 | Rosenberg et al. | 345/156 |
| 2002/0095224 A1 * | 7/2002 | Braun et al. | 700/44 |
| 2002/0149561 A1 | 10/2002 | Fukumoto et al. | |
| 2003/0038776 A1 * | 2/2003 | Rosenberg et al. | 345/156 |
| 2004/0161118 A1 | 8/2004 | Chu | |
| 2006/0044280 A1 | 3/2006 | Huddleston et al. | |
| 2006/0149495 A1 | 7/2006 | Mazalek et al. | |
| 2006/0278065 A1 | 12/2006 | Ramstein | |
| 2006/0288137 A1 * | 12/2006 | Grant et al. | 710/62 |
| 2006/0290662 A1 * | 12/2006 | Houston et al. | 345/156 |
| 2007/0221046 A1 | 9/2007 | Ozaki et al. | |
| 2007/0236450 A1 * | 10/2007 | Colgate et al. | 345/156 |
| 2008/0068348 A1 | 3/2008 | Rosenberg | |
| 2008/0084384 A1 * | 4/2008 | Gregorio et al. | 345/156 |
| 2008/0271594 A1 | 11/2008 | Starr | |
| 2009/0013857 A1 | 1/2009 | Ramstein | |
| 2009/0064849 A1 | 3/2009 | Festejo | |
| 2009/0072662 A1 | 3/2009 | Sadler et al. | |
| 2009/0106655 A1 * | 4/2009 | Grant et al. | 715/702 |
| 2009/0126553 A1 | 5/2009 | Murray | |
| 2009/0167509 A1 * | 7/2009 | Fadell et al. | 340/407.2 |
| 2009/0167704 A1 | 7/2009 | Terlizzi et al. | |
| 2009/0312102 A1 | 12/2009 | Oberg et al. | |
| 2009/0322496 A1 | 12/2009 | De Costa | |
| 2011/0005367 A1 | 1/2011 | Hwang et al. | |

OTHER PUBLICATIONS

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Kontarinis et al., "Tactile Display of Vibratory Information in Teleoperation and Virtual Environments," Presence, 4(4):387-402, 1995.

Minsky, "Computational Haptics: The Sandpaper System for Synthesizing Texture for a Force-Feedback Display," Ph.D. Dissertation, MIT, Jun. 1995.

Patrick et al., "Design and Testing of A Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Patrick, "Design, Construction, and Testing of a Fingertip Tactile Display for Interaction with Virtual and Remote Environments," Master of Science Thesis, MIT, Nov. 8, 1990.

Rabinowitz et al., "Multidimensional tactile displays: Identification of vibratory intensity, frequency, and contactor area," Journal of the Acoustical Society of America, vol. 82, No. 4, Oct. 1987.

SMK Corporation, "Multi-Functional Touch Panel, Force-Feedback Type, Developed: A Touch Panel Providing a Clicking Feeling," http://www.smk.co.jp/whatsnew_e/628csc_e.html, Sep. 30, 2002.

SMK Corporation, "Force Feedback Type Optical Touch Panel Developed," SMK Corporation Website, Oct. 30, 2002.

Patent Cooperation Treaty, International Preliminary Report on Patentability, International Application No. PCT/US2009/057808, mailed Apr. 7, 2011.

Written Opinion of the International Searching Authority in PCT/US2009/057808, dated Dec. 9, 2009.

International Preliminary Report on Patentability for PCT//US2009/057808, mailed Dec. 16, 2009.

The State Intellectual Property Office of the People's Republic of China, Notification of the Third Office Action, Application No. 200980137633, dated May 27, 2014.

The State Intellectual Property Office of the People's Republic of China, Decision on Rejection, Application No. 200980137633, dated Sep. 3, 2014.

* cited by examiner

MULTIPLE ACTUATION HANDHELD DEVICE WITH FIRST AND SECOND HAPTIC ACTUATOR

CROSS-REFERENCE TO RELATED APPLICATIONS

This application is a continuation of co-pending U.S. patent application Ser. No. 12/237,334, filed Sep. 24, 2008, entitled "Multiple Actuation Handheld Device," the entirety of which is hereby incorporated by reference.

TECHNICAL FIELD

The present disclosure relates to a multiple actuation handheld device.

BACKGROUND

Mobile gaming has become increasingly popular with the improvements Internet speed as well as more sophisticated mobile devices. Such portable mobile devices include smart phones (e.g. Blackberry®, iPhone®) as well as mobile video game consoles (e.g. Playstation® Portable, Nintendo DS Lite®).

Additionally, many of the existing mobile devices incorporate one or more touch screens through which the user interacts with an avatar or other object while playing a game. However, none of the existing mobile devices are capable of outputting haptics through the touch screen as the user is playing a game on the device.

OVERVIEW

A device includes a housing, and a processor that is coupled to the housing. The processor is configured to process a software program stored in a memory. A touch screen is coupled to the housing and configured to display graphical objects, wherein a sensor signal associated with a user's interaction with the touch screen is provided to the processor. A first actuator is coupled to the touch screen and is positioned within the housing. The first actuator is configured to output a first haptic effect to the touch screen upon receiving a first activating signal from the processor. A second actuator is coupled to the housing and is configured to output a second haptic effect to the housing upon receiving a second activating signal from the processor. The first activating signal is associated with a foreground event and the second activating signal is associated with a background event occurring in the software program.

A device comprises a housing and a processor coupled to the housing. The processor is configured to process a software program stored in a memory. A touch screen is coupled to the housing, and the touch screen is configured to display graphical objects, wherein a sensor signal associated with a user's interaction with the touch screen is provided to the processor. An actuator is coupled to the touch screen and is positioned within the housing. The actuator is configured to output a first haptic effect to the touch screen upon receiving a first activating signal from the processor which is associated with a foreground event occurring in the software program. The actuator is configured to output a second haptic effect to the housing upon receiving a second activating signal from the processor which is associated with a background event occurring in the software program.

A method for operating a mobile device comprises displaying a graphical environment through a touch screen of a housing of the mobile device. The method includes sensing a position of a user's input in contact with the touch screen. The method includes identifying a haptic event occurring in association with an interaction within the graphical environment and transmitting an activating signal to an actuator, wherein the actuator imparts a haptic effect that corresponds to the haptic event to the touch screen upon determining that the haptic event is a foreground event.

A method for operating a mobile device comprises displaying a graphical environment through a touch screen of a housing of the mobile device. The method includes sensing a position of a user's input in contact with the touch screen and identifying a haptic event occurring in association with an interaction within the graphical environment. The method includes transmitting an activating signal to an actuator, wherein the actuator imparts a haptic effect that corresponds to the haptic event to the housing upon determining that the haptic event is a background event.

In an embodiment, the foreground event occurs as a result of the user's interaction with the touch screen. In an embodiment, the first actuator only outputs the first haptic effect when a sensor coupled to the touch screen indicates the user touching the touch screen. In an embodiment, the first actuator outputs the first haptic effect and the second actuator outputs the second haptic effect at substantially the same time or different times.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Example embodiments are described herein in the context of a multiple actuation handheld mobile device. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. It is understood that the phrase "an embodiment" encompasses more than one embodiment and is thus not limited to only one embodiment. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

Figure 1:
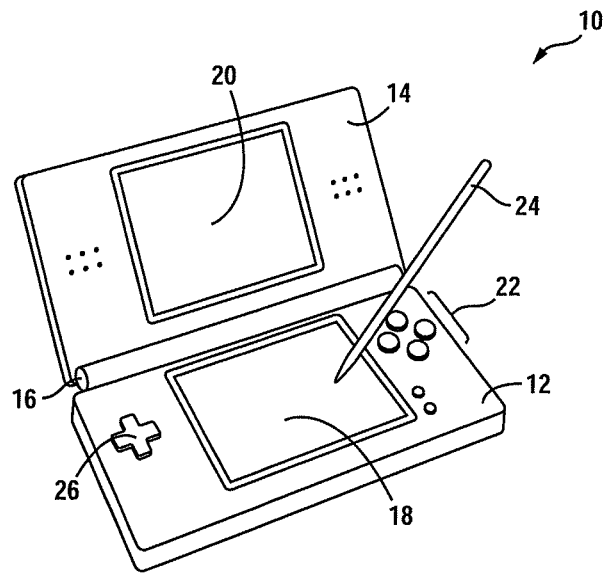
FIG. 1 illustrates a perspective view of a mobile gaming device in accordance with the prior art.

FIG. 1 illustrates a perspective view of a mobile gaming device in accordance with the prior art. As shown in FIG. 1, the mobile gaming device 10 includes a bottom portion 12 and a top portion 14 pivotably attached to the bottom portion 12 at the hinge 16. The device 10 includes an interactive touch screen 18 in the bottom portion 12 with which the user is able to select or interact with displayed graphical items, objects or characters by physically touching the screen 18 using a finger, stylus or guitar pick. The device 10 also includes a display 20 in the top portion 14 which also displays items, objects, characters or other information to the user. Although not necessary, the display 20 in the top portion 14 may also be a touch screen in which the user is able to interact with the displayed items on the display 20 by physically touching the display 20.

In addition, the device 10 may include a directional pad 26 and/or selection buttons. A stylus 24 may be used with the touch screen 18 to interact with the displayed items. Although the stylus 24 has a pen shaped design in FIG. 1, the stylus 24 may have other designs, such as a guitar pick, as discussed in more detail below. It should be noted that although the description above and following discussion are directed to the mobile gaming apparatus in FIG. 1, it should be noted that the dual actuation system can be applied in a smart phone or other type of electronic device with gaming capabilities that are not illustrated herein.

Figure 2:
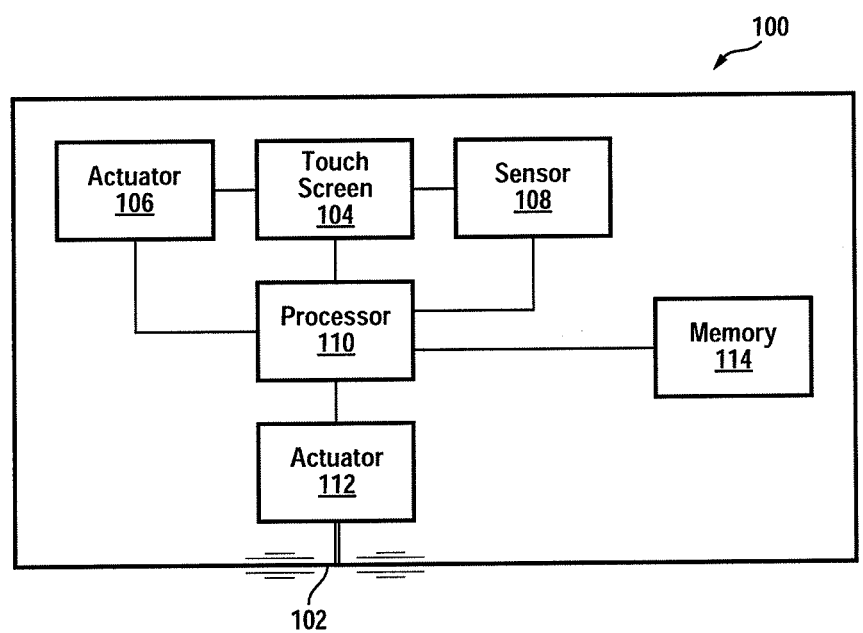
FIG. 2 illustrates a block diagram of a dual actuating touch screen gaming device in accordance with an embodiment.

FIG. 2 illustrates a block diagram of a multiple actuating handheld device in accordance with an embodiment. As shown in FIG. 2, the device 100 includes a housing 102, one or more touch screens 104, one or more actuators 106 coupled to the touch screen 104, and one or more processors 110 coupled to the touch screen 104 and the actuator 106. A memory 114 is preferably coupled to the processor 110, whereby the processor 110 is able to store and retrieve information from the memory 114. Such information may include, but is not limited to, haptic effect profiles, game data, software data, etc.

In addition, as shown in FIG. 2, the device 100 includes a sensor 108 coupled to the touch screen 104, whereby the sensor 108 monitors the position and/or movement of the user's finger, stylus 24 or other input means along the touch screen 104. The sensor 108 preferably provides sensor signals to the processor 110 to indicate the pressure, position and/or movement of the stylus 24, whereby the processor 110 running the software program updates the display shown through the touch screen 104 in response thereto. In an embodiment, the touch screen 104 incorporates the sensor 108 therein as an integral component, and thus the sensor 108 is not a separate component. However, for purposes of discussion, the sensor 108 is referred to herein as a separate component. Touch screen technology is well known in the art and is thus not described in detail herein.

The actuator 106 (hereinafter referred to as screen actuator) is configured to output one or more haptic effects to the touch screen 104 upon receiving an activating signal from the processor 110. It is contemplated that the actuator 106 may be configured to output one or more haptic effects to more than one touch screen 104 on a device (if available). In an embodiment, the actuator 106 is in direct contact with the touch screen 104, although it is not necessary as long as the haptic effects output by the actuator 106 are localized to the touch screen 104 and thus transmitted therethrough. In other words, such haptic effects from the screen actuator 104 are preferably localized to the touch screen 104 and are not significantly felt in the housing. Thus, it is preferred that the user's hand holding the housing 102 will not feel any, or at least not a significant amount, of the haptic effect when the screen actuator 106 is activated. However, the user's will feel the haptic effect from the actuator 106 when directly touching the touch screen 104 via the fingers or the stylus 24 In an embodiment, the device can include a plurality of actuators for multiple touch screens whereby one or more actuators in the plurality can output haptic effects to the appropriate touch screen. For instance, a user playing a device with two or more touch screens can move a graphical character from one touch screen to another. One or more actuators coupled to the first touch screen can output a haptic effect to that touch screen while the character is displayed thereon. As the user moves the character from the first touch screen to a second touch screen, one or more actuators coupled to the second touch screen can output a haptic effect to the second touch screen, thereby continuing the haptic experience to the user as the character is moved between the screens. It is contemplated that the haptic effects output to the first and second touch screens may be same of different effects and/or at same or different times.

In an embodiment, the device 100 preferably includes one or more actuators 112 coupled to the processor which outputs a haptic effect upon receiving an activating signal from the processor 110. The actuator 112 (hereinafter referred to as housing actuator) is preferably coupled to an interior of the housing 102 such that the haptic effect output by that actuator 112 is transmitted through the housing 102 instead of the touch screen 104. In an embodiment, the housing actuator 112 is part of an external device or peripheral that is externally mounted to the housing 102. The haptic effect output by the housing actuator 112 is felt through the user's hand holding the device 100 rather than the user's hand interacting with the touch screen 104. Although it is disclosed that the actuator 112 outputs the haptic effect through the housing 102, it is possible that the haptic effect profile (e.g. magnitude, duration, and/or frequency) is modulated that the haptic effect is also felt through the touch screen 104. It should also be noted that although two actuators are described (e.g. screen actuator 106 and housing actuator 112), it is possible that more than two actuators be used in the device. In an embodiment, only one actuator can be used in the device, whereby the actuator is coupled to the housing 102 and the touch screen 104 and thus can selectively output haptic effects to the touch screen 104 and/or the housing 102 when desired.

The above mentioned actuators can be of various types including, but not limited to, eccentric rotational mass (ERM) actuators, linear resonant actuators (LRA), piezoelectric actuator, voice coil actuator, electro-active polymer (EAP) actuators, memory shape alloys, pager motors, moving magnet actuators, E-core actuators etc. Some examples of actuator assemblies capable of being used with the touch screen are described in U.S. Pat. No. 7,148,875 as well as U.S. patent application Ser. No. 10/919,798 filed Aug. 17, 2004, and Ser. No. 11/128,717 filed May 12, 2005.

The actuators 106 and 112 are capable of outputting the same or different haptic effects at same or different times. The dual actuation capability of the device allows for a wider range of haptic sensations and adds realism to the game being played as will be discussed below. In particular, the device is capable of utilizing the screen actuator 106 and the housing actuator 112 to selectively output haptic effects which provide the user with a more pleasurable (or immersed) experience during game play.

The actuators 106 and 112 output their respective haptic effects in response to a haptic event occurring in the graphical environment. The haptic event is referred to herein as any interaction, action, collision, or other event which occurs during operation of the device which can potentially have a haptic effect associated with it that is then output to the user in the form of the haptic effect. For example purposes, a haptic event may occur when a graphical vehicle the user is controlling experiences wind turbulence during game play, whereby an example haptic effect associated with the haptic event is a vibration. Another example is that a haptic event may occur when a missile collides with the user's character in the game, whereby an example haptic effect associated with the haptic event is a jolt or pulse. Haptic events may also be indirectly associated with the game play, but nonetheless provides the user with important device information while the user is playing a game (e.g receiving a text message, completion of a song download, battery level low, etc.).

In an embodiment, device 100 preferably takes into account actions occurring within the video game along with the user's sensed inputs to determine whether the screen actuator 106 or the housing actuator 112 will be activated to output haptic effects to the user. In particular, the device 100 determines which actuator to activate based on whether haptic event is considered a foreground event or a background event. Whether the haptic event is a foreground or background event can be written in the software code, wherein the processor 110 upon processing the software code, automatically instructs which actuator to operate. It is also contemplated that the processor 110 determines whether the haptic event is a foreground or background event based on whether the haptic event is a direct result of the user's input into the touch screen 104. If so, the haptic effect may have a more pronounced effect if felt in the hand interacting with the touch screen.

For instance, an interaction between the user's stylus 24 and a graphical object on the touch screen 104, such as dragging a video game character through sand by moving the stylus 24 across the touch screen 104, may be considered a foreground event. In other words, the foreground haptic effects are preferably best utilized with interactions in which the user is in contact with the touch screen 104. In operation, the sensor 108 monitors the user moving the character slowly through sand and provides the processor such sensing information. In response, the processor 110 in conjunction with the software program outputs an activating signal associated with a haptic effect (such as a vibratory textural haptic effect) to the screen actuator 106, whereby the activating signal preferably carries information of a haptic effect profile (e.g. magnitude, frequency, duration). The screen actuator 106 upon receiving the activating signal outputs the haptic effect to the touch screen 104, whereby the haptic effect is felt directly by the user's finger or a hand holding the stylus 24.

In an embodiment, the device 100 substantially simultaneously updates the outputted haptic effect based on the user's input. For instance, in the example, the screen actuator 106 will receive signals from the processor 108 to increase the frequency and/or vibration in response to the sensor 108 monitoring the user's stylus 24 moving across the touch screen 104 at an increasing rate. In this instance, the touch screen 104 may begin to vibrate faster and/or with greater intensity to magnify the haptic effect, thereby giving the user a realistic haptic response during game play.

In an embodiment, the screen actuator 106 may output an entirely different haptic effect in response to the sensed movement of the user's input into the touch screen 104. For example, as stated above, a vibration may be output by the screen actuator 106 in response to the user moving the character across the screen in sand. In the example, the screen actuator 106 is instructed to output a jolt, bump or pop to the touch screen 106 upon the user's character colliding with a graphical obstacle in the sand. It should be noted that either or both of the screen and housing actuators are capable of outputting haptic effects including, but not limited to, time-based effects such as vibrations and pulses as well as position-based effects such as textures, detents and bumps.

In an embodiment, the device 100 is preferably capable of outputting haptic effects to the housing. As stated above, the housing actuator 112 is configured to output haptic effects to the housing 102 of the device 100, whereby the haptic effects are preferably felt on the hand holding the device 100. It is preferred, although not necessary, that the housing actuator 112 output haptic effects for haptic events which are considered background events. It is preferred that the processor 110 determines whether the haptic event will be a foreground and/or background event. In an embodiment, the determination of whether a haptic event is a background and/or foreground event is written in the software code, whereby the processor 110 automatically selects which actuator to activate based on the software code. An example of a background event may be an interaction between the two objects displayed on the touch screen 104, such as a missile hitting the graphical character. The processor 110 processes such information and transmits an activating signal to the housing actuator 112 having the requisite haptic profile (e.g. magnitude, frequency, duration). The housing actuator 112 upon receiving such signal outputs the corresponding haptic effect to the housing 102. The user is then able to feel the haptic effect in the hand that is holding the device 102, thereby providing the user with a pleasurable and realistic experience. It is contemplated that the haptic event be considered a background event when the haptic event is user-independent, such as pulses when bullets are fired at the user's character. In contrast, the bullets hitting the character may be a considered by the processor as a foreground event, thereby causing the screen actuator 106 to output one or more haptic effects to the touch screen 104. Haptic events which are based on background routines in the software or not directly related to the game being played (e.g. incoming text message, download complete) may be automatically considered by the processor 110 as a background event.

An example is provided in which a graphical gear shifter is displayed through a touch screen 104, whereby the gear shift is able to be shifted between two or more positions. In the example, the displayed gear shifter may be operated by the user by moving the shifter via a finger or stylus along the touch screen 104. In the example, the processor 110 is provided sensor information that the user has shifted the displayed shifter and determines that a foreground event and a background event have occurred. The processor 110 preferably updates the gear shifter displayed on the touch screen to show the new position of the shifter. The processor 110 thereby outputs an activating signal to the screen actuator 106 to output a haptic effect to the touch screen 104 and an activating signal to the housing actuator 112 to output a haptic effect to the housing. In response, the actuator 106 outputs the haptic effect to the touch screen 104, whereby the haptic effect is felt in the user's contacting finger or stylus. The haptic effect output by the screen actuator 106 is preferably a jolt or click in response to the virtual shifter being shifted ("foreground event"). In addition, the housing actuator 112 outputs a low frequency and/or magnitude vibration which is felt in the user's hand which is holding the device 100 ("background event"). In the example, as the user continues to up-shift as the vehicle goes faster during game play, the screen actuator 106 outputs a click or jolt and the housing actuator 112 outputs a higher frequency and/or magnitude vibration. In contrast, if the user continues were down-shift, the screen actuator 106 would output a click or jolt whereas the housing actuator 112 would output a lower frequency and/or magnitude vibration.

It should be noted that the above examples are not limiting and it is contemplated that the processor 110 along with the video game software processes which events and interactions in the game are to be designated as foreground events and background events. However, as stated above, it is preferred, though not necessary, that the foreground events be designated to actions which are felt while the user hand or stylus is in contact with the touch screen 104. It is also contemplated that the foreground events be dedicated to the housing actuator 112 and the background events be dedicated to the screen actuator 106.

It is also contemplated that both actuators 106, 112 are capable of outputting same or different haptic effects at least partially at the same time in response to an interaction within the game. For example, the processor 110, as instructed by the software, may activate the screen actuator 106, which outputs the haptic effect when the touch screen 104 shows the character colliding with a stack of barrels. Thereafter, as the barrels fall to the ground, the processor 110, as instructed by the software, determines that this is a background haptic event and activates the housing actuator 112 to output a haptic effect that corresponds to the event to the housing 102.

In an embodiment, the processor 110 may determine which actuator is to output the haptic effect based on whether the sensor 108 indicates that the user's hand or stylus is in contact with the touch screen 104. Therefore, if the action is such that it could be either or both of the actuators 106, 112, the processor 110 may activate just the housing actuator 112 if it is determined that the user is not contacting the touch screen 104. This process may be used to conserve battery life of the device 100 if the action is indeed a foreground event, but it is determined that the user is not contacting the touch screen 104.

In another embodiment, the device is configured such that the foreground and background events are clearly distinguishable based on the type of game that is played. One example is Guitar Hero in which the device 100 is used as a mock guitar that allows the user to to simulate the playing of music, represented on-screen 20 by colored notes that correspond to fret buttons on the controller. A brief discussion of the Guitar Hero game is provided for clarity of use with the device 100.

Figure 3:
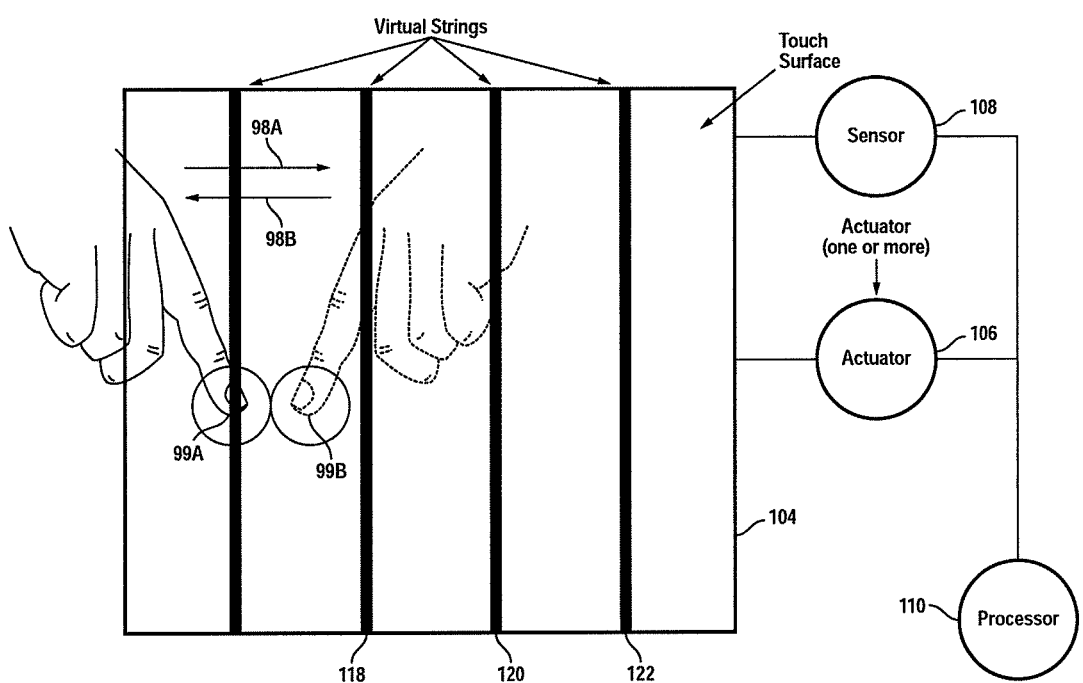
FIG. 3 illustrates a view of a touch screen having virtual strings displayed thereon in accordance with an embodiment.

In a game such as Guitar Hero, the screen actuator 106 is able to output haptic effects to the touch screen 104 as the user strums the displayed strings to give the user the feeling of striking real strings. The touch screen 104 may include one or more screen actuators 106 coupled thereto which provide the user with haptic effects isolated to the touch screen 104 to simulate the feel of playing across the virtual displayed strings. In an embodiment shown in FIG. 3, the touch screen 104 is shown displaying four virtual strings 116, 118, 120 and 122, although a greater or lesser number of displayed strings are contemplated. The touch screen 104 tracks the position of the user's finger or stylus as it moves along the surface of the touch screen 104 and provides positional, velocity and/or acceleration information to the processor 110. It is contemplated that the screen actuator 106 output a jolt or pop haptic effect once the user's finger comes into contact with string 116, whereby the haptic effect signifies that the user has struck one or more strings. The same or different haptic effect could apply for strings 118, 120 and/or 122. In the embodiment, the screen actuator 106 outputs a series of jolts or pops to signify that the user has struck one or more strings, whereby each jolt or pop represents a string being struck. In particular, the screen actuator 106 outputs a jolt or pop as the sensor 108 tracks the user moving the user's finger or stylus across each displayed string on the touch screen 104. It is contemplated that direction of the movement of the finger is tracked such that a first haptic effect is output when the finger moves across one or more strings from left to right (represented by arrow 98A) and a second haptic effect is output when the finger moves across the one or more strings from right to left (represented by arrow 98B).

Additionally or alternatively, the device may be configured to output a first haptic effect when the user's finger is on the displayed string (as shown at string 116), whereas a second haptic effect is then output when the finger (shown as 99B) is dragged a predetermined distance away from the string 116 to simulate the release of the string 116. In an embodiment a time offset delay (e,g, 50 ms or other time duration) is preferably added to the playback of the second haptic effect to separate the two haptic effects and prevent them from feeling blended. The second haptic effect can be a jolt or click felt on the touch screen 104 (i.e. string striking back to its default position) and/or a vibration to the housing 102 (i.e. vibrational hum felt on the guitar body). This provides a more distinct feel and creates the experience of the same type of time lag that occurs when a real guitar string returns to its original position after being released.

Additionally or alternatively, the device may utilize pressure sensor information from the touch screen 104 to produce the second haptic effect. For instance, once the first haptic effect is output (the finger has moved across string 116 toward position 99B), the actuator 106 may wait to output the second haptic effect until the user's finger has reached position 99B or has begun to gradually relieve pressure off the touch screen 104 (thus gradually releasing the virtual string). In particular, the sensor 108 provides the processor 110 with information regarding the amount of pressure applied to the touch screen 104, whereby the processor 110 outputs the activating signal upon the pressure data passing a threshold value. It is preferred, however, that the second haptic effect occurs while the user's finger is still on the screen 104 to ensure that the haptic effect is felt by the user. It should be noted that the first and second haptic effects described above can be the same as one another or be different from one another.

Additionally or alternatively, the housing actuator 112 may also be activated along with the screen actuator 106, but outputs a different or varied haptic effect from that output by the screen actuator 106. In particular, the housing actuator 112 may receive a signal to instruct it to output a lower frequency vibration to the housing. The vibration can mimic the audio of the notes being played or just provide a realistic feeling of a guitar being played (i.e. a chord being strummed). In an embodiment, the haptic effect output by the housing actuator 112 may start out with a low amplitude and increase in magnitude as the user continues to get the timing right for the game in an effort of simulating the 'flow' experience of playing a guitar. Alternatively if the user's timing is off, a discordant haptic effect could be output by any or all of the actuators (screen actuator as well as housing actuator) as an indication to the user. In an embodiment, the haptic effects output by the screen and housing actuators 106, 112 may vary depending on the type of guitar selected by the user in the video game (e.g. greater vibrations in the body for "hollow body" guitars as opposed to more subtle vibrations in the body of a "solid body" guitar.)

In an embodiment, the screen and/or housing actuators 106, 112 may be instructed by the processor 110 to output haptic confirmation of button presses or strum events when the user successfully strikes the notes during play. In other words, haptic effects would be output by the actuators 106, 112 to provide confirmation of button presses or strumming effects when the user successfully depresses the correct button on the controller 200 with the button displayed on the screen 20.

In an embodiment, the device may be configured to output one or more haptic effects from either or both actuators 106, 112 to indicate that the user has successfully depressed in a predetermined number of correct notes. For example, in the game there is the concept of "note streaks" when the user successfully depresses a predetermined number of consecutive correct notes. The device may output one or more haptic effects from either or both actuators 106, 112 to reward the player after a note streak milestone is achieved. A haptic effect could also be output by either or both actuators 106, 112 that increases in magnitude as the user continues to hit more consecutive correct notes, whereby the increased magnitude is felt in the housing 102 or touch screen. As soon as the user misses a note the effect resets and the user knows that the effect streak has ended. Alternatively, the device may be configured to output another haptic effect when the user depresses one or more incorrect buttons.

One gaming concept is head-to-head play or "battle mode," whereby two players compete against one another to successfully hit the most number of notes in a given time. A feature in the battle mode is for one player to launch distraction items that distract the other player during the competition. For example, in the battle mode, one distraction item when launched causes the other player's screen to catch fire, thereby preventing the user from seeing the notes for a given amount of time and thus inhibiting their ability to successfully hit notes during that time. The distraction items can be used between devices 100, whereby launched distraction items cause the recipient's device 100 to uncontrollably vibrate in the touch screen 106 and/or housing 102 or output haptic effects which cause an irregular beat or beats not in sync with the notes displayed on the screen, or temporarily disable haptic effects altogether.

Figure 4:
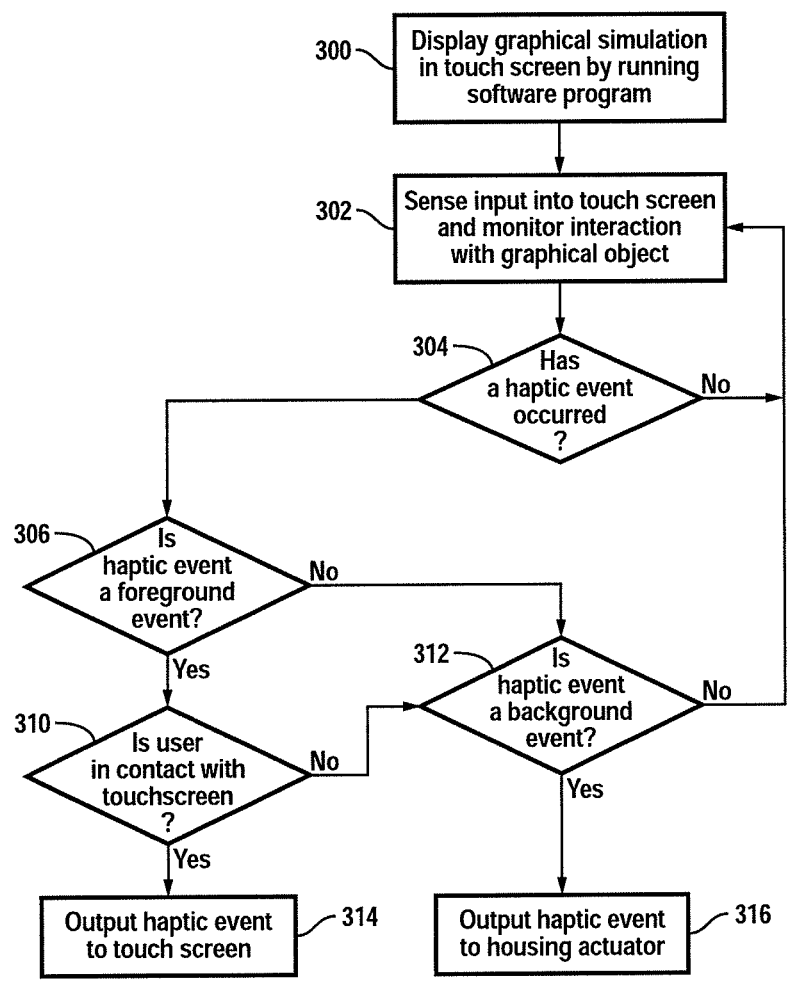
FIG. 4 illustrates a flow chart of the operation of the device in accordance with an embodiment.

FIG. 4 illustrates a flow chart of the operation of the dual actuating device in accordance with an embodiment. As shown in FIG. 4, the device 100 runs a software program which allows a selectively interactive graphical virtual environment to be displayed on one or more display screens. In particular, the device displays the graphical environment via the touch screen display as in 300. A sensor (either separate from or integrated with the touch screen) continuously monitors inputs by the user as the user touches the touch screen by a stylus or by using a finger as in 302. Upon a haptic event occurring in the graphical environment, the processor 110 of the device determines whether a haptic effect should be output, as in 304. This would depend on the software run by the processor and whether the software provides for a haptic effect to be applied for that particular haptic event. If so, the processor and/or software determines whether the associated haptic effect should be a foreground event (as in 306) or a background event (as in 312).

If the haptic effect is to be considered a foreground event 306, an optional step would be to determine whether the user's finger or stylus is in contact with the touchscreen (as in 310). As stated above, determining this could potentially conserve battery power in the device 100 by only outputting haptic effects to the touch screen 104 when it is ensured that the haptic effect would be felt by the user. Alternatively, upon determining that the user is not in contact with the touch screen 104, the processor may be configured to instruct the housing actuator 112 to instead output the haptic effect to the housing. If it is determined that the user is in contact with the touch screen 104, the activating signal is sent from the processor to the screen actuator 106 to output the desired haptic effect to the touch screen 104. In an embodiment, if it is determined that the user's finger or stylus is not in contact with the touch screen, it is determined whether the haptic event would be considered a background event (as in 312). If the haptic event is not considered a background event, the device 100 preferably does not instruct any of the actuators to output a haptic effect, and the device 100 continues to sense input by the user into the touch screen 104 (302). However, if the haptic event is considered to be a background event, the processor transmits an activating signal to the housing actuator 112 to output a haptic effect to the housing 102 (316).

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A device comprising:
   a housing;
   a processor coupled to the housing, the processor configured to process a software program stored in a memory;
   a touch screen coupled to the housing, the touch screen configured to display graphical objects, wherein a sensor signal associated with a user's interaction with the touch screen is provided to the processor;
   a first actuator coupled to the touch screen and positioned within the housing, the first actuator configured to output a first haptic effect to the touch screen in response to receiving an actuator signal from the processor; and
   a second actuator coupled to the housing, the second actuator configured to output a second haptic effect to the housing in response to receiving the actuator signal from the processor,
   wherein the processor is configured to:
      determine the occurrence of an event in a software application,
      determine whether the user is contacting the touch screen, determine whether the event is a foreground event or a background event, and responsive to determining that the event is a foreground event and that the user is contacting the touch screen, transmit an actuator signal to the first actuator, responsive to determining that the event is a foreground event and that the user is not contacting the touch screen, transmit the actuator signal to the second actuator; or responsive to determining that the event is a background event, transmit the actuator signal to the second actuator.

2. The device of claim 1, wherein the foreground event occurs as a result of the user's interaction with the touch screen.

3. The device of claim 1, wherein the user touches the touch screen with a stylus.

4. The device of claim 1, wherein the first actuator outputs the first haptic effect and the second actuator outputs the second haptic effect at substantially the same time.

5. The device of claim 1, wherein the first actuator outputs the first haptic effect and the second actuator outputs the second haptic effect at different times.

6. A method for operating a mobile device comprising:

identifying a haptic event occurring in association with an interaction within a graphical environment displayed on a touch screen;

determining whether a user is contacting the touch screen, determining whether the haptic event is a foreground event or a background event; and if the event is a foreground event and the user is contacting the touch screen, transmitting an actuator signal to a first actuator coupled to the touch screen, if the event is a foreground event and the user is not contacting the touch screen, transmitting the actuator signal to a second actuator coupled to the housing, or if the event is a background event, transmitting the actuator signal to the second actuator.

7. The method of claim 6, wherein the foreground event occurs as a result of the contact with the touch screen.

8. The method of claim 6, wherein the first actuator only outputs the haptic effect when user contacts the touch screen with a stylus.

9. The method of claim 6, wherein the first actuator and the second actuator output respective haptic effects at substantially the same time.

10. The method of claim 6, wherein the first actuator and the second actuator output respective haptic effects at different times.

11. A non-transitory computer-readable medium comprising program code, the program code configured to be executed by a processor, the program code comprising:

program code for identifying a haptic event occurring in a software application executed on a device, the software application configured to display a graphical environment through a touch screen of a housing of the mobile device;

program code for determining whether a user is contacting the touch screen;

program code for determining whether the haptic event is a foreground event or a background event; and program code for, responsive to determining that the event is a foreground event and that the user is contacting the touch screen, transmitting an actuator signal to a first actuator coupled to the touch screen, program code for, responsive to determining that the event is a foreground event and that the user is not contacting the touch screen, transmitting the actuator signal to a second actuator coupled to the housing, or program code for, responsive to determining that the event is a background event, transmitting the actuator signal to the second actuator.

12. The non-transitory computer-readable medium of claim 11, wherein the foreground event occurs as a result of the contact with the touch screen.

13. The non-transitory computer-readable medium of claim 11, wherein the first actuator only outputs the haptic effect when the user contacts the touch screen with a stylus.

14. The non-transitory computer-readable medium of claim 11, wherein the first actuator and the second actuator output respective haptic effects at substantially the same time.

15. The non-transitory computer-readable medium of claim 11, wherein the first actuator and the second actuator output respective haptic effects at different times.

* * * * *